United States Patent
Oka et al.

(10) Patent No.: US 9,360,714 B2
(45) Date of Patent: Jun. 7, 2016

(54) DISPLAY DEVICE

(71) Applicant: Japan Display Inc., Tokyo (JP)

(72) Inventors: Shinichiro Oka, Tokyo (JP); Tomohiko Naganuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 3 days.

(21) Appl. No.: 14/287,363

(22) Filed: May 27, 2014

(65) Prior Publication Data

US 2014/0347615 A1  Nov. 27, 2014

(30) Foreign Application Priority Data

May 27, 2013  (JP) .................... 2013-111015

(51) Int. Cl.
*G02F 1/1343* (2006.01)
*G02F 1/29* (2006.01)
*G02B 27/22* (2006.01)

(52) U.S. Cl.
CPC ...... *G02F 1/134309* (2013.01); *G02B 27/2214* (2013.01); *G02F 1/29* (2013.01); *G02F 2001/294* (2013.01); *G02F 2201/124* (2013.01)

(58) Field of Classification Search
CPC .................................................. G02F 1/134336
USPC ........................................ 349/141, 143, 186
See application file for complete search history.

(56) References Cited

U.S. PATENT DOCUMENTS

| | | | |
|---|---|---|---|
| 2002/0008827 A1* | 1/2002 | Yoo et al. | 349/141 |
| 2003/0128325 A1* | 7/2003 | Yun et al. | 349/143 |
| 2014/0002761 A1* | 1/2014 | Heo et al. | 349/33 |

FOREIGN PATENT DOCUMENTS

| | | |
|---|---|---|
| JP | 7-77748 A | 3/1995 |
| JP | 2009-520231 A | 5/2009 |
| WO | 2007/072289 A2 | 6/2007 |

* cited by examiner

*Primary Examiner* — Lucy Chien
(74) *Attorney, Agent, or Firm* — Typha IP LLC (57) ABSTRACT

The liquid crystal lens is formed by placing a TN type liquid crystal with a twist angle of 90 degrees between the first and second substrates. A first substrate having a flat surface with a slit is formed on the liquid crystal side of the first substrate, and a second electrode having a comb electrode, as seen in a plane view, is formed on the liquid crystal side of the second substrate. The slit formed in the first electrode extends in the same direction as the comb electrode of the second electrode, and the slit is located in the center between the comb electrodes of the second electrodes as seen in a plane view, to prevent the electric lines of force, moving from directly above the second electrode to the first electrode, from spreading in the plan direction, thereby preventing light leakage directly above the second electrode.

5 Claims, 12 Drawing Sheets

DISPLAY DEVICE

CLAIM OF PRIORITY

The present application claims priority from Japanese Patent Application JP 2013-111015 filed on May 27, 2013, the content of which is hereby incorporated by reference into this application.

BACKGROUND

The present invention relates to a display device, and more particularly, to a 3D display device including a liquid crystal lens having a lens function on the display surface side of a liquid crystal display panel.

A display device that can switch between three-dimensional (3D) display and two-dimensional (2D) display with naked eyes without glasses includes, for example, a first liquid crystal display panel for performing image display, and a second liquid crystal display panel provided on the display surface side (observer side) of the first liquid crystal panel to form a parallax barrier that allows light to be separately incident on the right and left eyes of the observer in 3D display. In such a display device that can switch between 2D display and 3D display, the refractive index in the second liquid crystal display panel is changed by controlling the alignment of the liquid crystal molecules in the second liquid crystal display panel, to form lens (lenticular lens, cylindrical lens array) areas extending in the vertical direction of the display surface and arranged side by side in the lateral direction, in order to direct the light of the pixels corresponding to the left and right eyes into the observer's eye.

With respect to the 3D display device of the liquid crystal lens type having such a structure, for example, an auto-stereoscopic display device is described in Japanese Unexamined Patent Application Publication (Translation of PCT Application) No. 2009-520231. In the display device described in Japanese Unexamined Patent Application Publication (Translation of PCT Application) No. 2009-520231, a planar electrode is formed on one of two transparent substrates facing each other with a liquid crystal layer interposed therebetween. Then, a strip-like electrode (linear electrode) extending in the lens formation direction is formed on the other transparent substrate. The linear electrode is arranged side by side in the lens arrangement direction. With this configuration, the switching control between 2D display and 3D display can be achieved by adjusting the refractive index of liquid crystal molecules by controlling the voltage applied to the strip-like electrode and the voltage applied to the planar electrode. Further, the liquid crystal lens described in Japanese Unexamined Patent Application Publication (Translation of PCT Application) No. 2009-520231 is a liquid crystal lens of TN alignment.

Japanese Patent No. 2862462 descries a structure in which an optical characteristic variable lens is provided between the electrodes on the liquid crystal display panel, to form a 3D image by controlling the lens characteristics by applying a voltage to the electrodes between which the optical characteristic variable lens is placed.

Figure 10:
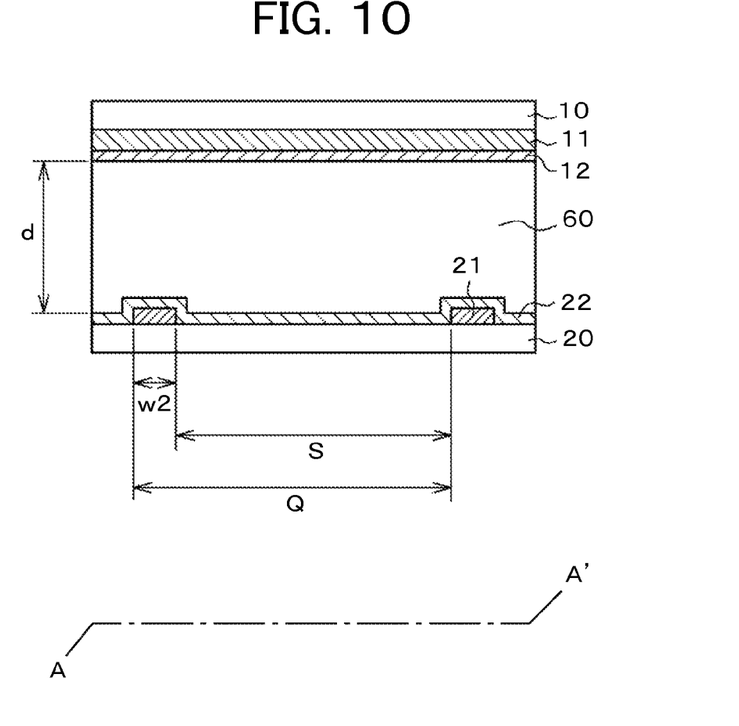
FIG. 10 is a cross-sectional view of the structure of a conventional liquid crystal lens.

FIG. 10 is a cross-sectional view of the structure of a conventional liquid crystal lens. In FIG. 10, a first electrode 11 is formed in a planar solid-state inside a first substrate 10 which is a transparent substrate, and a first alignment film 12 is formed on the first electrode 11. Then, a second electrode 21 having a strip-like (comb-like) shape is formed inside a second substrate 20 which is a transparent substrate. A second alignment film 22 is formed so as to cover the second electrode 21 formed in the second substrate 20. The alignment direction of the first alignment film 12 and the alignment direction of the second alignment film 22 are the same. The first substrate 10 and the second substrate 20 are preferably glass substrates, but may also be transparent plastic substrates. A liquid crystal layer 60 is provided between the first substrate 10 and the second substrate 20.

The electrode width of the comb electrode formed in the second substrate 20 is w2, the pitch between the comb electrodes is Q, and the comb electrode interval is s. The distance between the first substrate 10 and the second substrate 20, namely, the thickness of the liquid crystal layer is d. The liquid crystal has positive dielectric constant anisotropy. In a 3D image display device using a liquid crystal lens, it is possible to display a 3D image by applying a voltage between the first electrode 11 and the second electrode 21, and to display a 2D image when no voltage is applied between the first electrode 11 and the second electrode 21.

Figure 11:
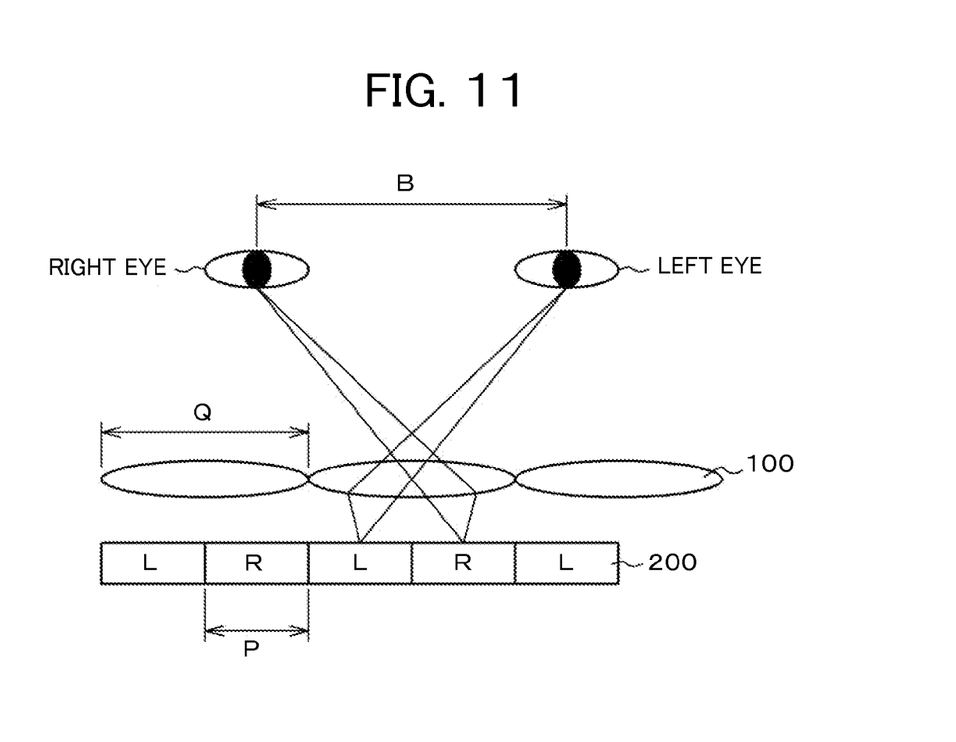
FIG. 11 is a schematic view showing the principle of 3D display using a liquid crystal lens.

FIG. 11 is a cross-sectional view showing the principle of the 3D image formation using a liquid crystal lens. In FIG. 11, human eyes view the image formed on the display device through the liquid crystal lens. In FIG. 11, the image for the right eye is R, and the image for the left eye is L. In FIG. 11, the pitch of a liquid crystal lens 100 is Q, and the pixel pitch of a display device 200 is P. Further, the distance between the centers of the human left and right eyes, namely, the interocular distance is B. In general, the interocular distance B is assumed to be 65 mm. The relationship between the pitch Q of the liquid crystal lens and the pixel pitch P of the display device is as shown in the equation 1.

Equation 1

数1

$$Q = \frac{2P}{(1 + P/B)} \quad (1)$$

Figure 12:
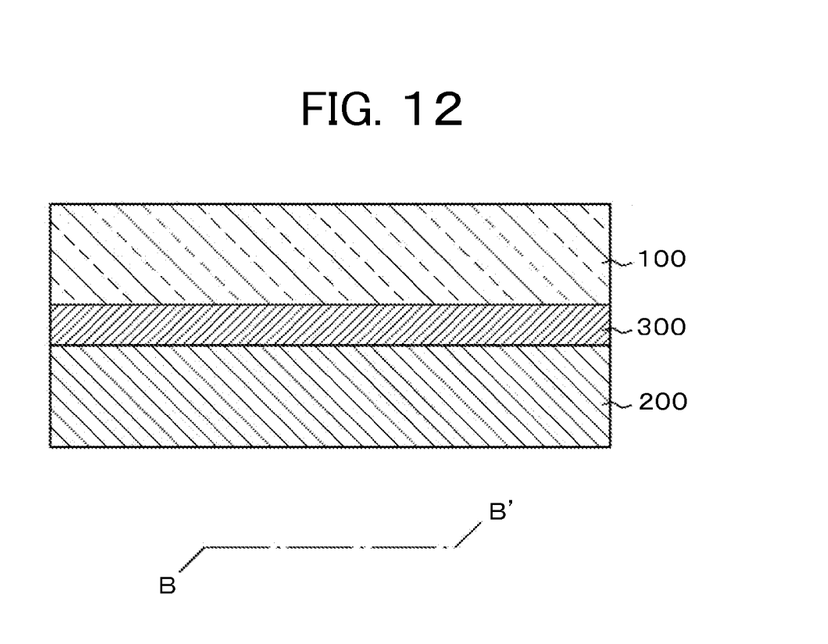
FIG. 12 is a cross-sectional view of the structure of a 3D image display device using a liquid crystal lens.

FIG. 12 is a schematic cross-sectional view of the 3D image display device using the liquid crystal lens 100 to which the present invention is directed. In FIG. 12, the liquid crystal lens 100 and the display device 200 are bonded with an adhesive 300. The adhesive 300 is transparent and, for example, a UV (ultraviolet) curing resin is used. A liquid crystal display device or an organic EL display device is used for the display device 200.

Figure 13A:
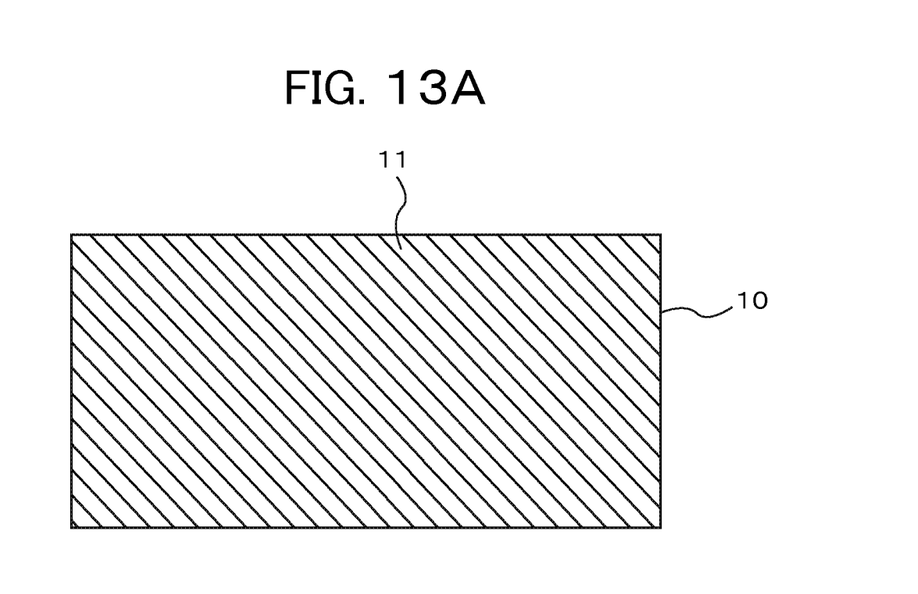
FIGS. 13A and 13B are plan views of the first and second electrodes in a liquid crystal lens.
Figure 13B:
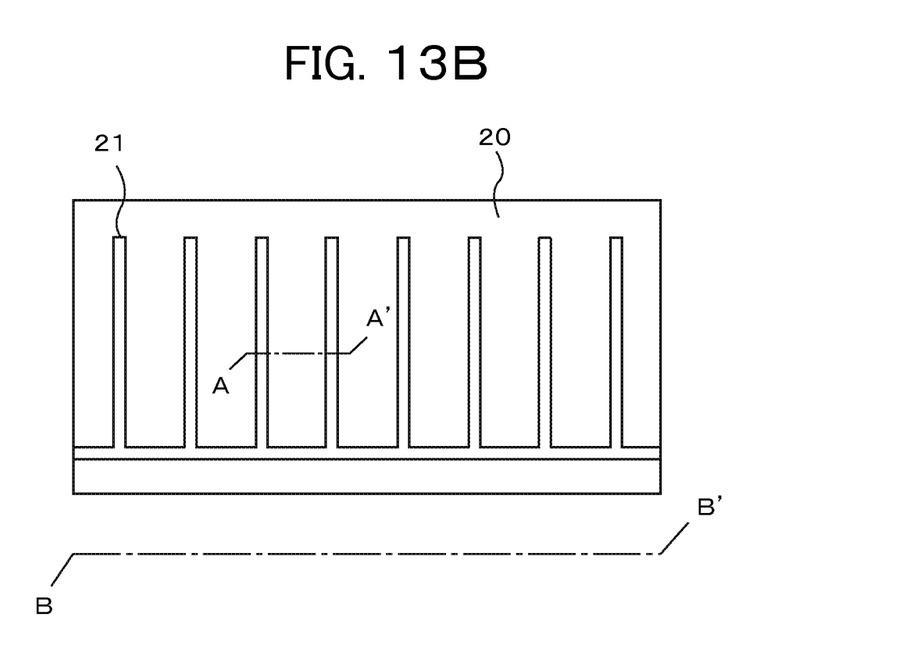

FIGS. 13A and 13B are plan views of the liquid crystal display lens corresponding to B-B' in FIG. 12. In FIGS. 13A and 13B, the entire display area of the first substrate 10 is covered by the first electrode 11. The second electrode 21 having a comb-like shape is formed in the second substrate 20. The second electrode 21 is connected by a bus electrode at an end thereof. Here, FIG. 10 is a cross-sectional view corresponding to the A-A' cross section in FIGS. 13A and 13B.

Figure 14A:
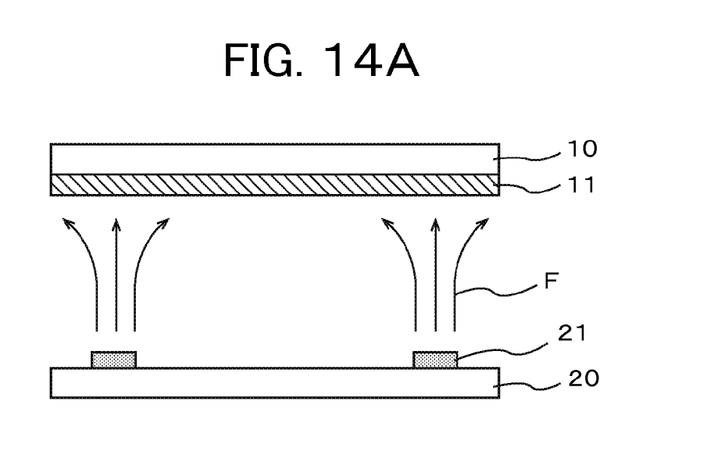
FIGS. 14A, 14B, and 14C are an example of the alignment of the liquid crystal molecules in the conventional liquid crystal lens.
Figure 14B:
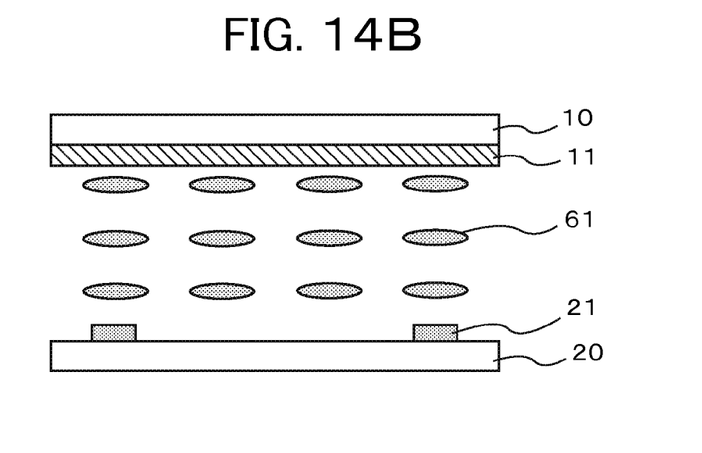
Figure 14C:
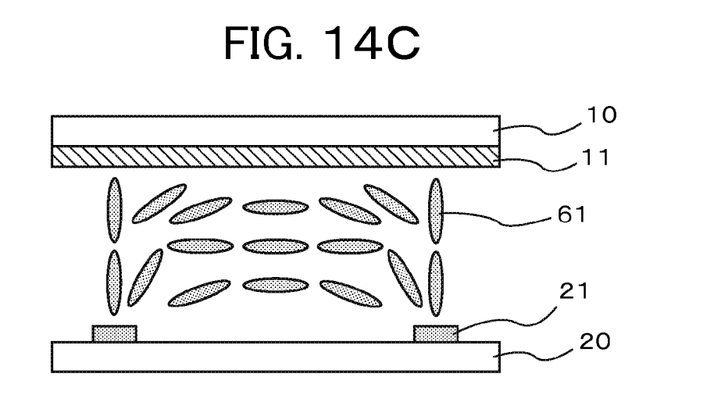

FIGS. 14A, 14B, and 14C are cross-sectional views showing the principle of the liquid crystal lens. When a voltage is applied between the first electrode 11 and the second electrode 21, electric lines of force F are generated as shown in FIG. 14A. If no voltage is applied between the first electrode 11 and the second electrode 21, the liquid crystal is horizontally aligned as shown in FIG. 14B. Note that in the drawings of the present application, the pretilt angle is ignored to avoid complications.

When a voltage is applied between the first electrode 11 and the second electrode 21, liquid crystal molecules 61 above the second electrode 21 rise up, and are horizontally aligned between the comb electrodes as shown in FIG. 14C. This results in a distribution in the refractive index, and a gradient index (GRIN) lens is formed.

A conventional common liquid crystal lens is shown in FIGS. 10 to 14C. In the liquid crystal lens having such a structure, disclination appears above the comb electrodes. Thus, there is a problem that crosstalk increases as the incident light is scattered in the upper part of the electrodes. Here, disclination is a discontinuous line due to the alignment of liquid crystal molecules, and crosstalk is a phenomenon in which the left eye image and the right eye image are not sufficiently separated. If the crosstalk is large, the 3D image is seen just as a double image.

Figure 15A:
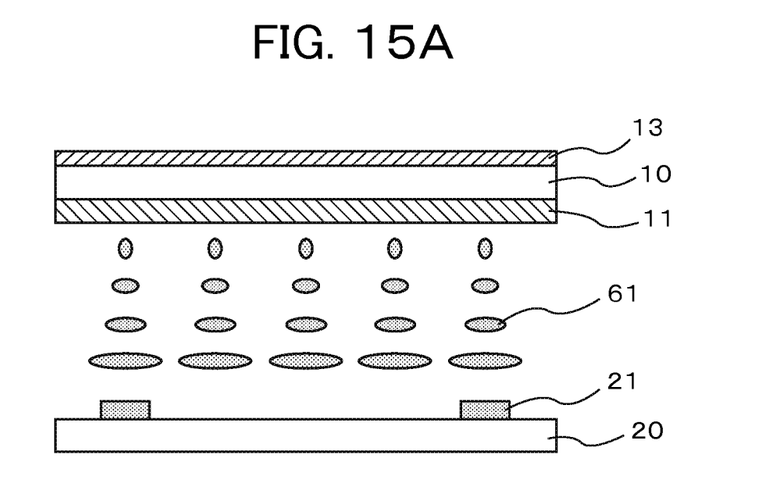
FIGS. 15A and 15B are cross-sectional views of the behavior of the liquid crystal lens of TN alignment.
Figure 15B:
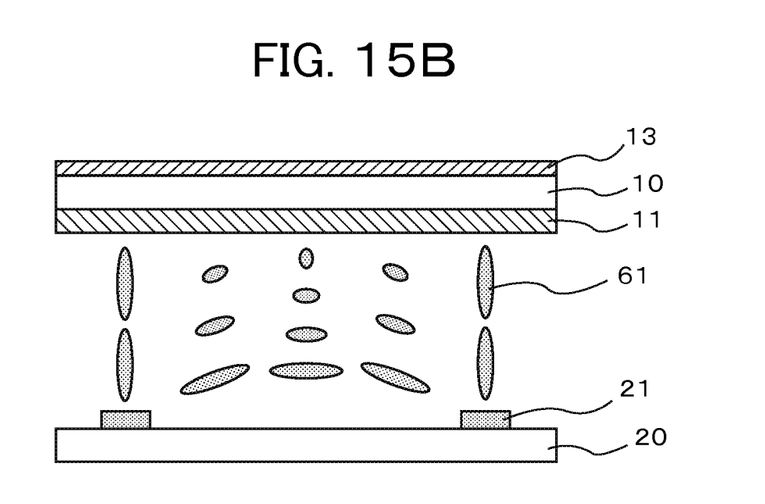

On the other hand, as shown in FIGS. 15A and 15B, the alignment of the liquid crystal molecules in the liquid crystal lens is converted into TN alignment. In this case, if a polarizing plate 13 is provided on the side opposite to the side of the liquid crystal of the second substrate 20, the crosstalk due to the disclination may be reduced. At this time, TN is 90-degree twisted alignment. In other words, in FIG. 15A, the alignment direction of the first alignment film (not shown) formed in the first substrate 10, and the alignment direction of the second alignment film (not shown) formed in the second substrate 20 are 90 degrees. The mechanism will be described below.

FIG. 15A shows the state in which no voltage is applied between the first electrode 11 and the second electrode 21. At this time, the image from the display device is not affected by the liquid crystal lens. FIG. 15B shows the state in which a voltage is applied between the first electrode 11 and the second electrode 21. The liquid crystal molecules are aligned so that a lens is formed between the comb electrodes which are the second electrodes 21. Meanwhile, the electric lines of force F are directed in the perpendicular direction to the second electrode 21, so that the liquid crystal molecules 61 are also perpendicularly aligned. In other words, the light from the display device does not transmit in this portion. As a result, it is possible to prevent the crosstalk.

In FIGS. 15A and 15B, it is desirable that the transmission axis of the polarizing plate 13 is tilted approximately 90 degrees with respect to the polarization direction of the light output from the display device. If the display device is a liquid crystal display device, the output light is polarized light. However, if the display device is an organic EL display device, it is necessary to attach the polarizing plate on the surface of the organic EL display device.

Figure 16:
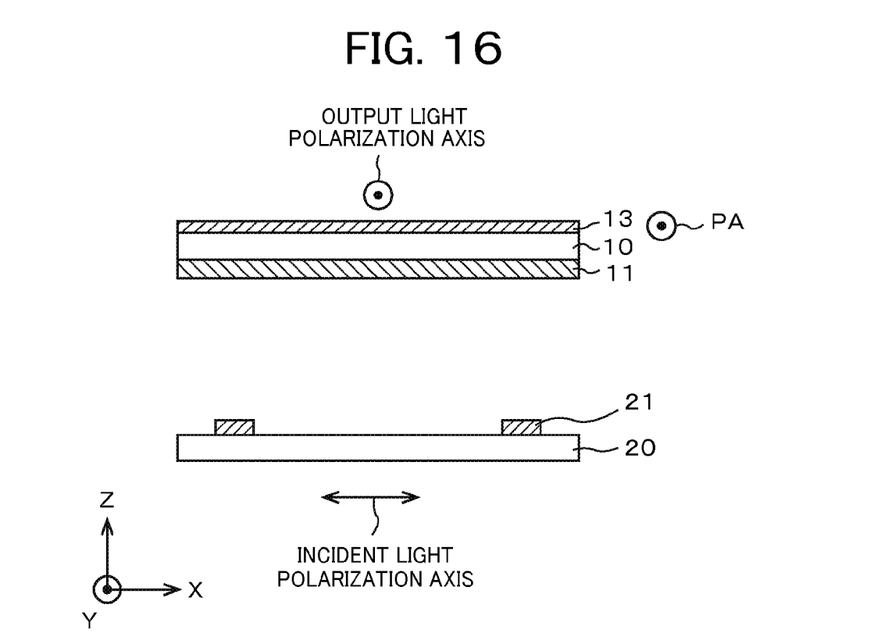
FIG. 16 is a schematic view showing the operation when no voltage is applied in the liquid crystal lens of TN alignment.
Figure 17:
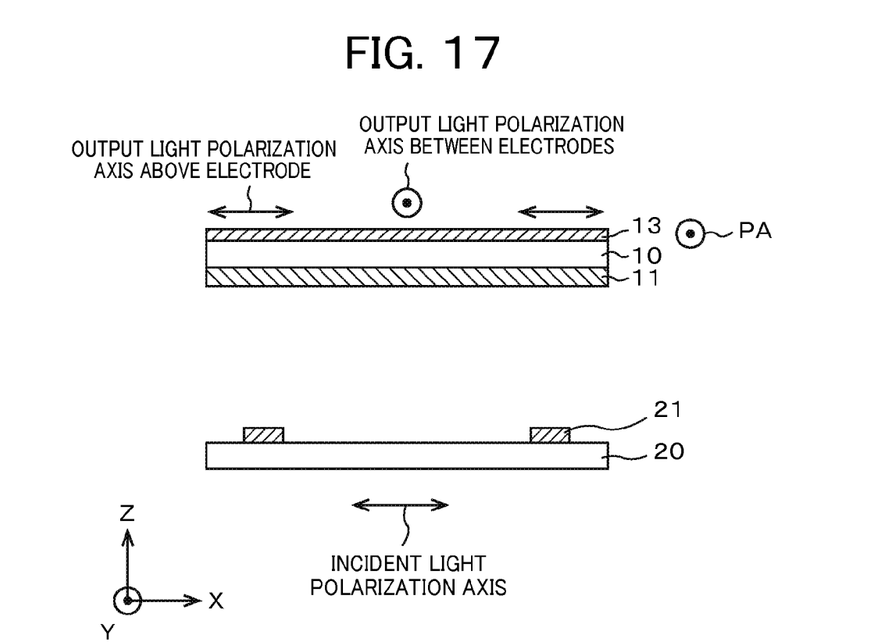
FIG. 17 is a schematic view showing the operation when a voltage is applied in the liquid crystal lens of TN alignment.

FIG. 16 is a cross-sectional view showing the details of this state. FIG. 16 is a cross-sectional view showing the relationship between the polarization direction of the incident light and the polarization direction of the output light, with respect to the transmission axis of the first polarizing plate 13, when no voltage is applied between the first electrode 11 and the second electrode 21. In FIG. 16, when the liquid crystal lens has TN alignment in the initial alignment, the incident polarized light is rotated at an angle of 90 degrees within the liquid crystal layer when no voltage is applied. Thus, if the input polarization direction is the X axis direction, the output polarization direction is the Y axis direction. The incident light is transmitted if a polarization transmission axis PA of the first polarizing plate is in the Y axis direction. In the 2D display in which no voltage is applied between the first electrode 11 and the second electrode 21, the liquid crystal lens has no influence on the output light from the display device.

On the other hand, when a voltage is applied to the liquid crystal lens of TN alignment, the alignment of the liquid crystal molecules 61 is as shown in FIG. 15B. As can be seen in FIG. 15B, the liquid crystal molecules 61 rise up above the second electrode 21, so that the optical rotation is lost. However, in the vicinity of the center between the second electrodes 21 which are the comb electrodes, the alignment of the liquid crystal molecules 61 is not substantially changed from the initial alignment. As a result, optical rotation occurs and the incident light polarization axis is rotated by 90 degrees. Thus, although the light is shielded above the second electrode 21, the light transmits between the second electrodes 21. The conventional liquid crystal lens has had a problem that disclination appears above the second electrode 21, causing crosstalk to increase due to the scattering of the light. However, this problem may be solved by the configuration shown in FIGS. 15A and 15B.

Thus, a liquid crystal lens of TN alignment was formed by the following parameters:
Liquid crystal physical property . . . $\Delta n=0.2$
Liquid crystal gap d: 30 μm
Panel size: 3.2"
Number of pixels . . . 480×854
Pixel pitch P: 79.5 μm
Lens pitch Q: 158.8058 μm
Electrode width: 10 μm However, in the liquid crystal lens described above, the ratio between the liquid crystal gap d1 and the electrode width w2, (d/w2), is as large as 3, so that the electric field is extended in the substrate in-plane direction. From this it is found that sufficient vertical electric filed is not generated. As a result, the light-shielding effect may not be obtained sufficiently above the second electrode 21.

Figure 18A:
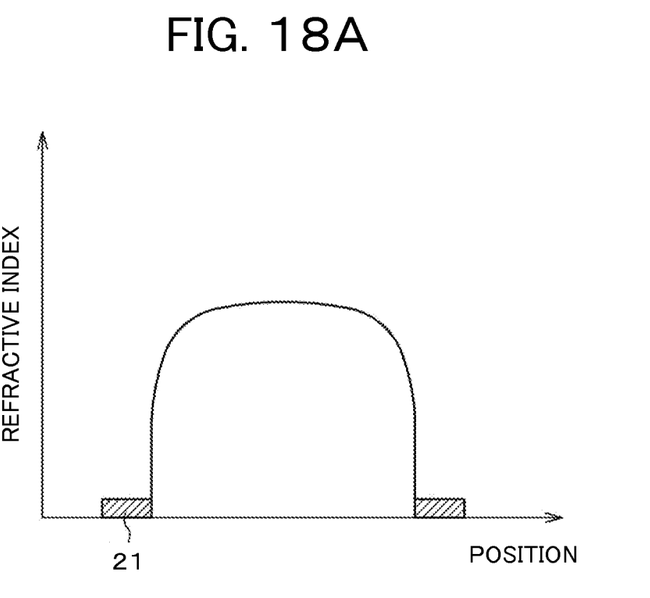
FIGS. 18A and 18B are comparative views of an ideal transmission distribution and the actual transmission distribution in the conventional example, in the liquid crystal lens of TN alignment.
Figure 18B:
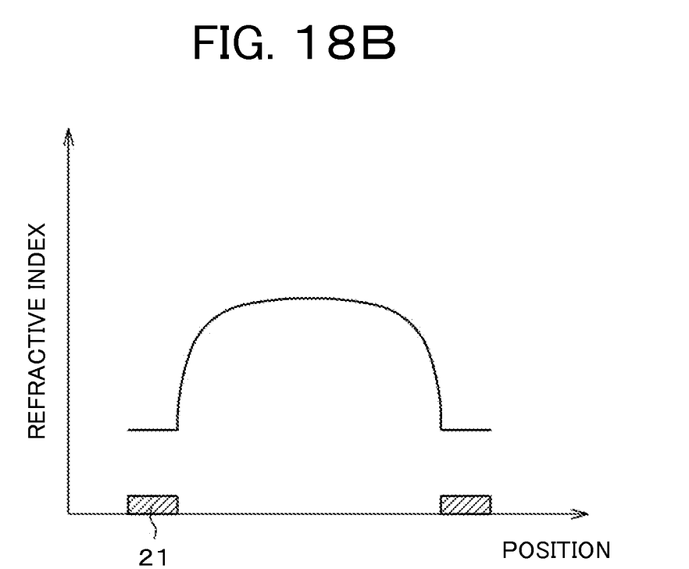

FIGS. 18A and 18B are an example of the transmission distribution of the liquid crystal lens of TN alignment. In FIGS. 18A and 18B, the horizontal axis is the position and the vertical axis is the transmission. In the ideal transmission distribution shown in FIG. 18A, the transmission is approximately zero in the vicinity of the second electrode 21. However, in the actual sample, the transmission is not sufficiently reduced in the vicinity of the second electrode 21 as shown in FIG. 18B, for the reasons described above. In other words, the desired light-shielding effect may not be obtained.

In a common TN type liquid crystal display device, the liquid crystal gap is about 4 μm, while the electrode width is several tens to hundreds of μm. In other words, the ratio between the gap and the electrode width is very small.

SUMMARY

The problem to be solved by the present invention is to sufficiently reduce the transmission above the second electrode in the liquid crystal lens of TN alignment, to prevent the appearance of disclination to prevent the crosstalk.

The principal solutions of the present invention for this problem are as follows.

(1) There is provided a display device with a liquid crystal lens disposed on a display panel. The liquid crystal lens includes a TN type liquid crystal with a twist angle of 90 degrees between a first substrate and a second substrate. A first electrode having a flat surface with a slit is formed on the liquid crystal side of the first substrate. A second electrode having a comb electrode, as seen in a plan view, is formed on the liquid crystal side of the second substrate. The slit formed in the first substrate extends in the same direction as the comb electrode of the second electrode. The slit is located at the center between the comb electrodes of the second electrodes as seen in a plan view.

(2) In the display device described in (1), a film of a material with a dielectric constant greater than the dielectric constant of the liquid crystal is formed in a portion of the first electrode corresponding to the comb electrode of the second electrode as seen in a plan view.

(3) In the display device described in (1), a film of a material with a dielectric constant smaller than the dielectric constant of the liquid crystal is formed so as to cover the slit in the first substrate between the comb electrodes of the second electrodes as seen in a plan view.

(4) There is provided a display device with a liquid crystal lens disposed on a display panel. The liquid crystal lens is formed by placing a TN type liquid crystal with a twist angle of 90 degrees between a first substrate and a second substrate. A first electrode is formed in a planar solid-state on the liquid crystal side of the first substrate. A second electrode with a comb-like shape as seen in a plan view is formed on the liquid crystal side of the second substrate. A film of a material with a dielectric constant greater than the dielectric constant of the liquid crystal is formed in a portion of the first electrode corresponding to the comb electrode of the second electrode as seen in a plan view.

(5) There is provided a display device with a liquid crystal lens disposed on a display panel. The liquid crystal lens is formed by placing a TN type liquid crystal with a twist angle of 90 degrees between a first substrate and a second substrate. A first electrode is formed in a planar solid-state on the liquid crystal side of the first substrate. A second electrode with a comb-like shape, as seen in a plan view, is formed on the liquid crystal side of the second substrate. A film of a material with a dielectric constant smaller than the dielectric constant of the liquid crystal is formed on the first substrate between the comb electrodes of the second electrodes as seen in a plan view.

DETAILED DESCRIPTION

Hereinafter the present invention will be described in detail with reference to preferred embodiments. Note that parameters described in the following embodiments are based on the structure of the liquid crystal lens formed in the Background of the invention.

First Embodiment

Figure 1:
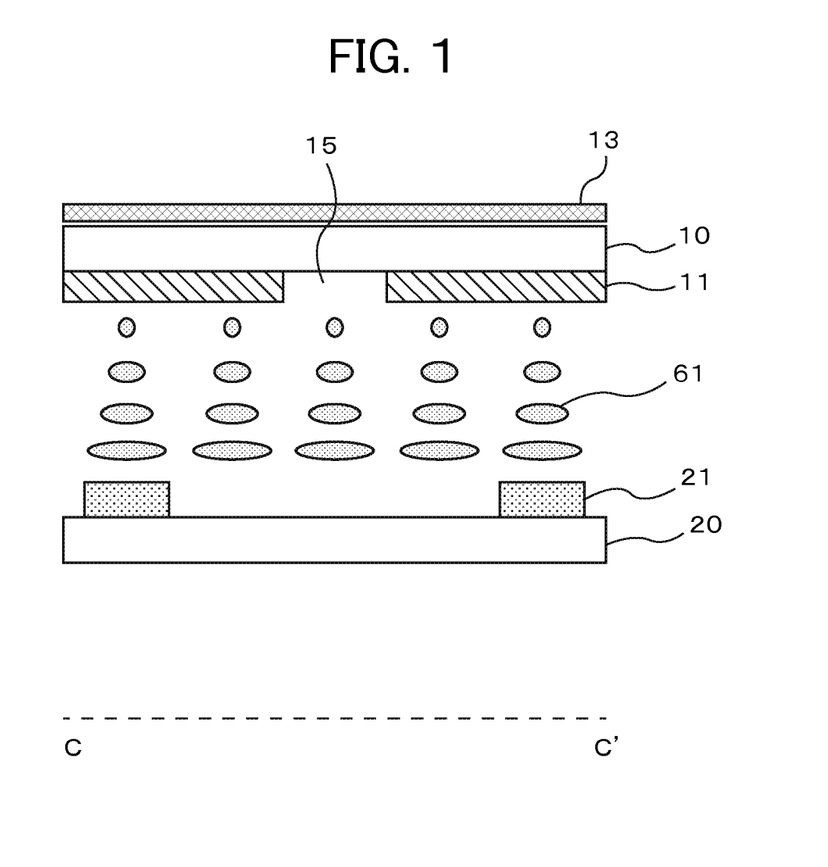
FIG. 1 is a cross-sectional view of a liquid crystal lens according to a first embodiment of the present invention.

FIG. 1 is a cross-sectional view of a first embodiment of the present invention. FIG. 1 is different from FIGS. 15A and 15B in that a slit 15 is formed in a first electrode 11 in the center of a lens, namely, in the center between a second electrode 21 and a second electrode 21 as seen in a plan view. The slit 15 extends in the direction perpendicular to the paper. Both the first electrode 11 and the second electrode 21 are formed by a transparent conductive film such as ITO. Hereinafter, the gap between the second electrode 21 and the second electrode 21 means the gap between comb electrodes of the second electrodes 21. Note that the second electrode 21 is the same meaning as the comb electrode of the second electrode 21.

Figure 2A:
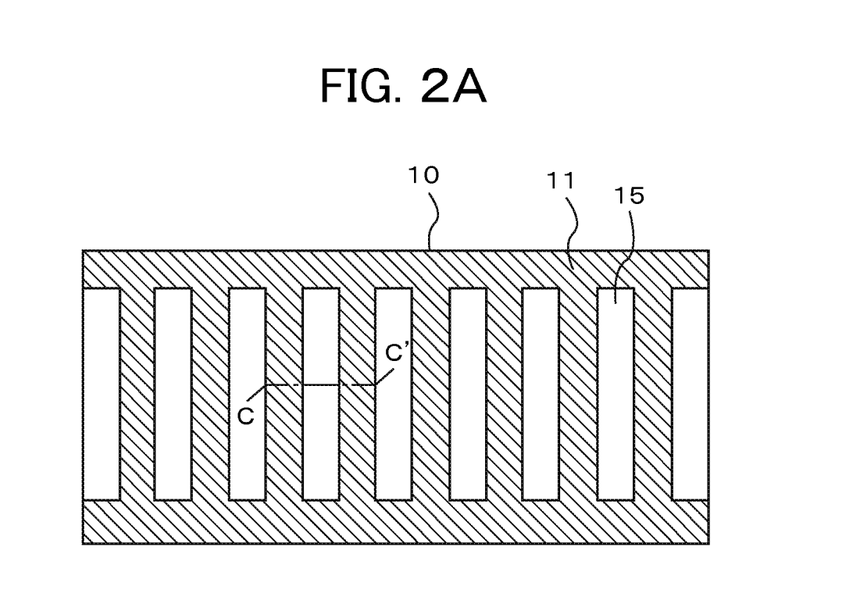
FIGS. 2A and 2B are plan views of first and second electrodes according to the first embodiment of the present invention.
Figure 2B:
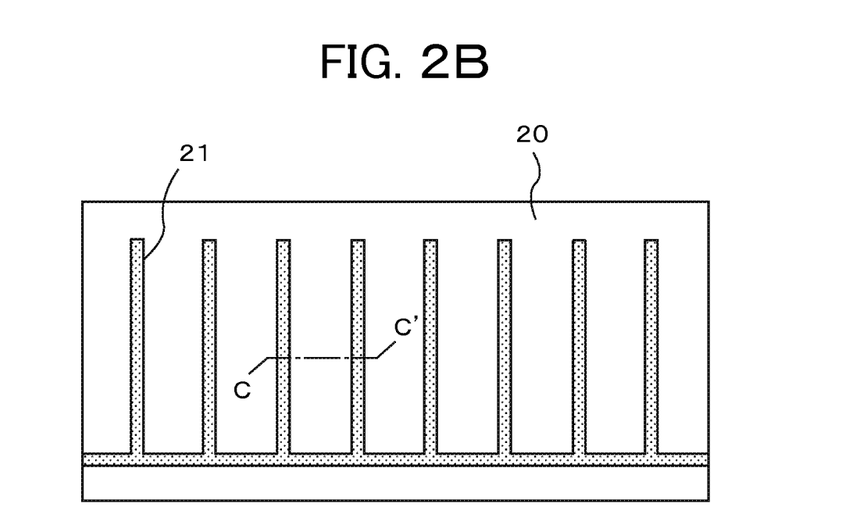

FIG. 2A is a plan view of the first electrode 11 in the first substrate 10. The slit 15 is formed within the first electrode 11. FIG. 2B is a plan view of the second electrode 21 in the second substrate 20. The shape of the second electrode 21 is the same as FIG. 13B which is the conventional example. The extending direction of the slit 15 formed in the first electrode 11 in FIG. 2A and the extending direction of the comb electrode of the second electrode 21 in FIG. 2 are the same. FIG. 1 corresponds to the C-C' cross section in FIGS. 2A and 2B.

FIG. 1 is a schematic view showing the state in which no voltage is applied between the first electrode 11 and the second electrode 21. In FIG. 1, when a voltage is applied between the first electrode 11 and the second electrode 21, it is possible to prevent the electric lines of force, which are directed from directly above the second electrode 21 to the first electrode 11, from spreading in the plane in the vicinity of the first electrode 11 by the influence of the slit 15 formed in the first electrode 11. Thus, it is possible to prevent the light from the backlight from transmitting directly above the second electrode 21.

Note that in the liquid crystal lens, the liquid crystal is hardly affected by the electric field in the vicinity of the slit 15, so that the optical rotation of the liquid crystal is maintained without the use of the electrode, which has little influence on the characteristics of the liquid crystal lens.

Figure 3:
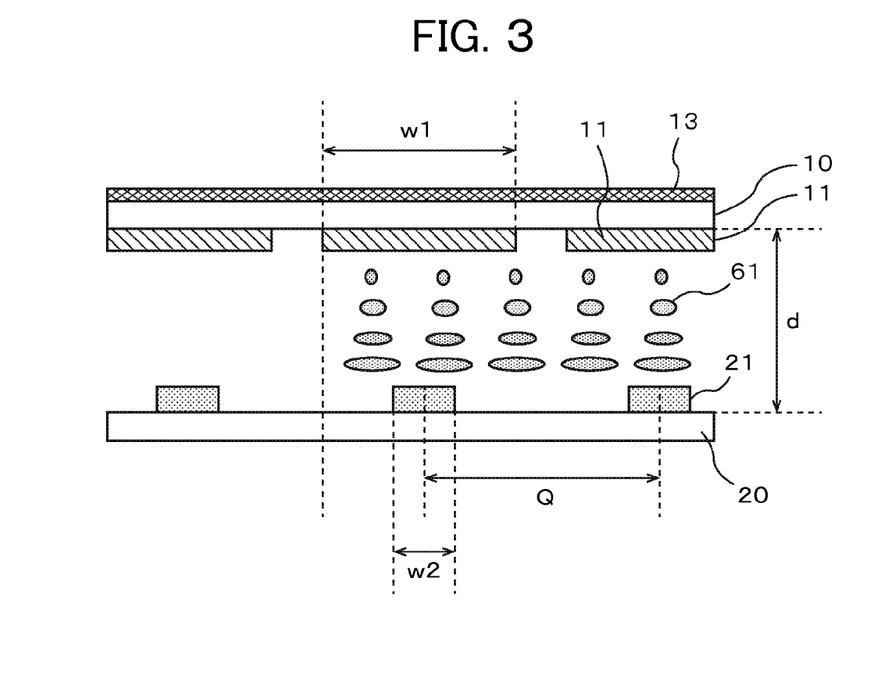
FIG. 3 is a cross-sectional view of the first embodiment of the present invention, in which the position is changed.

FIG. 3 is a cross-sectional view in which the position is changed from FIG. 1 in the liquid crystal lens according to the first embodiment. In FIG. 3, the first electrode width is w1, the second electrode width is w2, and the cell gap is d. The pitch Q between the second electrodes in FIG. 3, namely, the lens pitch is the same as the dimension of the sample described above: Q=158.8058 μm.

Figure 4:
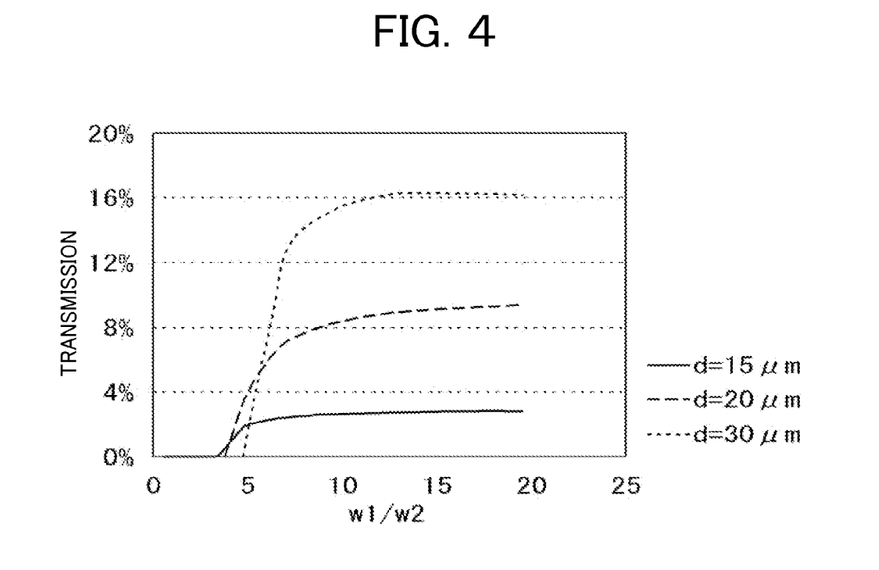
FIG. 4 is a graph showing the relationship between the ratio between the first electrode width and the second electrode width, and the transmission directly above the second electrode with cell gap as a parameter, according to the first embodiment.

FIG. 4 is a graph showing the ratio w1/w2 between the width of the first electrode 11, w1, and the width of the second electrode 21, w2, with respect to the transmission directly above the second electrode, when the cell gap d is set to 15 μm, 20 μm, and 30 μm. In FIG. 4, the horizontal axis is the ratio w1/w2 between the first electrode width w1 and the second electrode width w2, and the vertical axis is the transmission directly above the second electrode. In FIG. 4, when the value of w1/w2 is below a certain value, the transmission directly above the second electrode is zero. This is because the spread of the electric lines of force over the plane in the vicinity of the first substrate is reduced as w1/w2 decreases, and the optical rotation of the liquid crystal does not occur in this area. The ratio w1/w2, in which the transmission is actually zero, varies depending on the cell gap.

Figure 5:
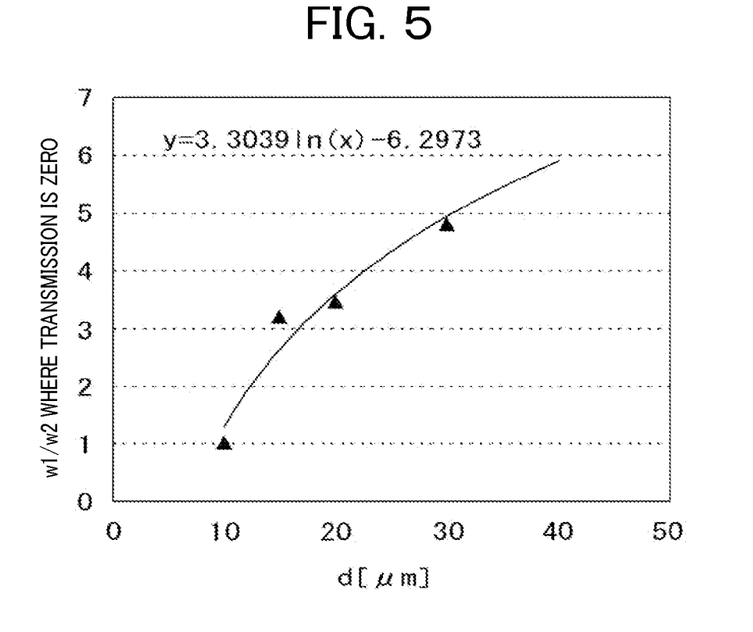
FIG. 5 is a graph showing the relationship between the cell gap and the ratio between the first electrode width and the second electrode width in which the transmission is zero above the second electrode.

FIG. 5 is a graph showing the relationship between the cell gap and w1/w2 in which the transmission is zero. In FIG. 5, the horizontal axis is the cell gap d, and the vertical axis is w1/w2 in which the transmission is zero. The grater the cell gap d is, the greater the ratio w1/w2 in which the transmission is zero.

Here, when w1/w2 in which the transmission is zero is represented by y and d is represented by x, the curve shown in FIG. 5 can be approximated by y=3.3039ln(x)−6.2973.

Figure 6:
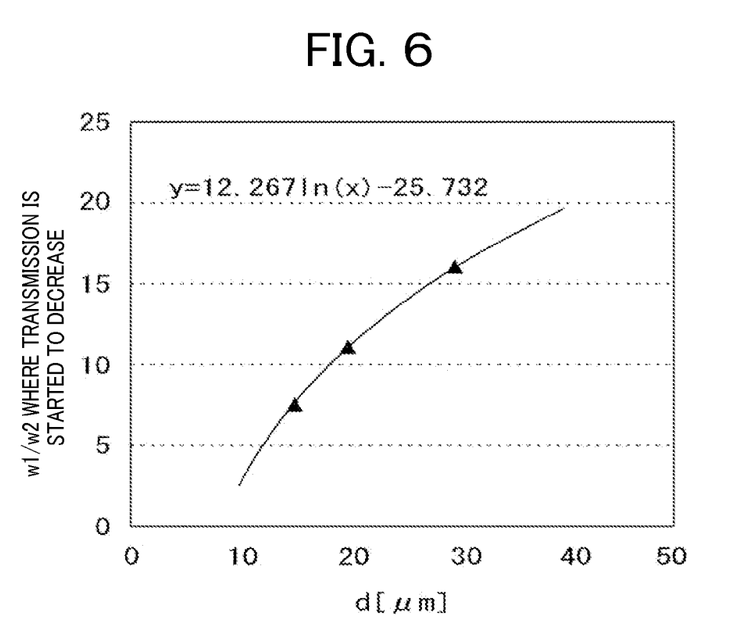
FIG. 6 is a graph showing the relationship between the cell gap and the ratio between the first electrode width and the second electrode width in which the transmission is started to decrease above the second electrode.

FIG. 6 is a graph showing the relationship between the cell gap d and w1/w2 in which the transmission is started to decrease in FIG. 4. In FIG. 6, the horizontal axis is the cell gap d, and the vertical axis w1/w2 in which the transmission is started to decrease directly above the second electrode. The greater the cell gap d is, the grater the ratio w1/w2 in which the transmission is started to decrease.

Here, when w1/w2 in which the transmission is zero is represented by y and d is represented x, the curve shown in FIG. 5 can be approximated by y=12.267ln(x)−25.732.

Second Embodiment

Figure 7:
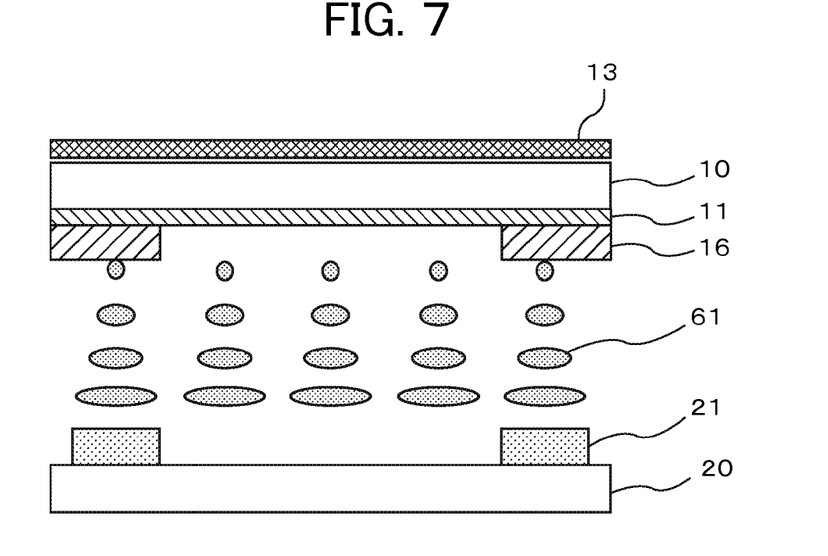
FIG. 7 is a cross-sectional view of a liquid crystal lens according to a second embodiment of the present invention.

FIG. 7 is a cross-sectional view of a liquid crystal lens according to a second embodiment of the present invention. FIG. 7 is different from the conventional example of FIG. 15 in that a high dielectric constant film 16 of a material with a dielectric constant greater than the dielectric constant of the liquid crystal is provided in the portion of the first electrode 11 corresponding to the second electrode 21. Because the high dielectric constant film 16 formed in the first substrate 10 is present, the electric lines of force from directly above the second electrode 21 are collected on the high dielectric constant film 16. Thus, it is possible to prevent the electric lines of force from spreading in the plan direction in the vicinity of the first substrate 10. As a result, it is possible to prevent the light from rotating directly above the second electrode, and prevent the light from the backlight from transmitting directly above the second electrode.

The liquid crystal molecule has a bar-like shape, in which the dielectric constant is different in the short diameter direction and the long diameter direction. In this case, the dielectric constant of the liquid crystal is the average in the short diameter direction and in the long diameter direction, and for example, 10. Thus, the dielectric constant of the high dielectric constant film is preferably 10 or more.

As described above, also in the present embodiment, it is possible to prevent the transmission directly above the second electrode, and prevent crosstalk due to disclination.

Third Embodiment

Figure 8:
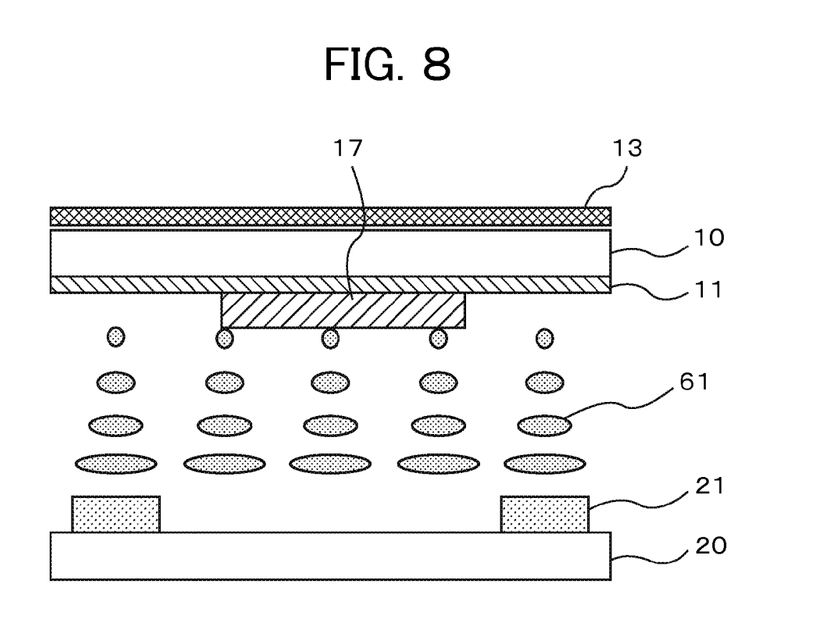
FIG. 8 is a cross-sectional view of a liquid crystal lens according to a third embodiment of the present invention.

FIG. 8 is a cross-sectional view of a liquid crystal lens according to a third embodiment of the present invention.

FIG. 8 is different from FIG. 15, which is the conventional example, in that a low dielectric constant film 17 of a material with a dielectric constant lower than the dielectric constant of the liquid crystal is formed in the portion of the first electrode 11 corresponding between the second electrodes 21, as seen in a plan view. Because the low dielectric constant film 17 formed in the first substrate 10 is present, the electric lines of force from directly above the second electrode 21 are distributed so as to avoid the low dielectric constant film 17. Thus, it is possible to prevent the electric lines of force from spreading in the plan direction in the vicinity of the first substrate 10. As a result, it is possible to prevent the light from rotating directly above the second electrode, and prevent the light from the backlight from transmitting directly above the second electrode.

As described above, the dielectric constant of the liquid crystal is, for example, about 10, so that the dielectric constant of the low dielectric constant film 17 is preferably 10 or less. Such a low dielectric constant material can be formed by a photosensitive resin such as epoxy resin or silicone resin.

As described above, also in the present embodiment, it is possible to prevent the transmission directly above the second electrode, and prevent crosstalk due to disclination.

Fourth Embodiment

Figure 9:
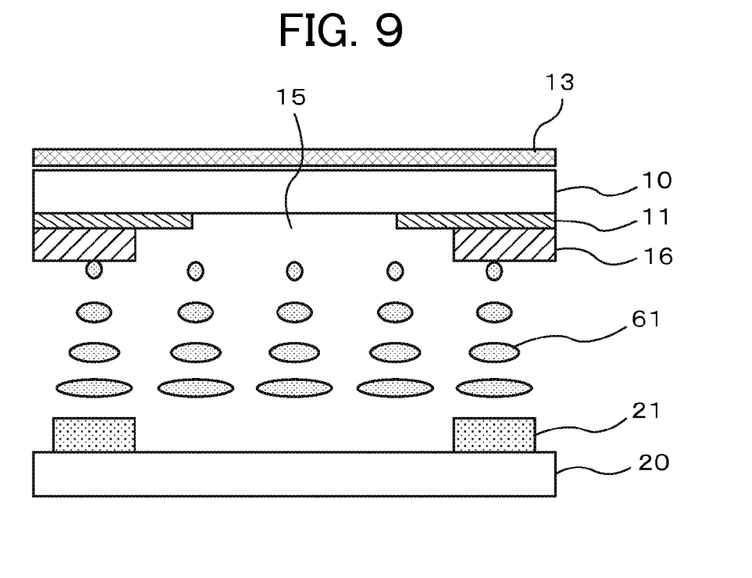
FIG. 9 is a cross-sectional view of a liquid crystal lent according to a fourth embodiment of the present invention.

FIG. 9 is a cross-sectional view of a liquid crystal lens according to a fourth embodiment of the present invention. FIG. 9 is a combination of the structure in which the slit 15 is formed in the first electrode 11 according to the first embodiment, and the structure in which the high dielectric constant film 16 is formed in the portion of the first substrate 10 corresponding to the second electrode 21 according to the second embodiment.

As described in the first embodiment, the electric lines of force from directly above the second electrode 21 is prevented from spreading in the plan direction in the vicinity of the first substrate 10 by the influence of the slit 15 formed in the first electrode 11. In addition, as described in the second embodiment, due to the presence of the high dielectric constant film 16 formed in the first electrode 11, the electric lines of force generated from directly above the second electrode are collected by the high dielectric constant film 16. Thus, it is possible to prevent the electric lines of force from further spreading in the plan direction in the vicinity of the first substrate 10. In this way, the present embodiment has the effect of both the first and second embodiments. As a result, it is possible to further reduce the transmission of the light from the backlight directly above the second electrode.

Although not shown, another aspect of the present embodiment is a structure in which the slit 15 is formed in the first electrode 11 as described in the first embodiment, and the low dielectric constant film 17 of a low dielectric constant material in the third embodiment is formed in the first substrate 10 so as to cover the slit 15. In this way, it is possible to form a liquid crystal lens having the effect of both the first and third embodiments. In this case, the low dielectric constant film 17 is formed in the first substrate 10 between the second electrodes 21, as seen in a plan view.

What is claimed is:
1. A display device with a liquid crystal lens disposed on a display panel,
wherein the liquid crystal lens is formed by placing a TN type liquid crystal with a twist angle of 90 degrees between a first substrate and a second substrate,
wherein a first electrode having a flat surface with a slit is formed on the liquid crystal side of the first substrate, wherein a second electrode having comb electrodes, as seen in a plan view, is formed on the liquid crystal side of the second substrate, the comb electrodes extend in a first direction and are arranged in a second direction with a pitch Q, a width of each of the comb electrodes in the second direction is w, and w<(Q−w) is satisfied, wherein the slit formed in the first electrode extends in the first direction, and wherein the slit is located in the center between the comb electrodes of the second electrodes in the second direction as seen in a plan view.

2. The display device according to claim 1, wherein a film of a material with a dielectric constant greater than the dielectric constant of the liquid crystal is formed in a portion of the first electrode corresponding to the comb electrodes of the second electrode as seen in a plan view, wherein the film extends in the first direction along each of the comb electrodes in a plan view, and wherein the film is not formed at the center between the comb electrodes in the second direction in a plan view.

3. The display device according to claim 1, wherein a film of a material with a dielectric constant smaller than the dielectric constant of the liquid crystal is formed so as to cover the slit in the first substrate, and wherein the film is not formed on the first substrate corresponding to the comb electrode of the second electrode in a plan view.

4. A display device with a liquid crystal lens disposed on a display panel, wherein the liquid crystal lens is formed by placing a TN type liquid crystal with a twist angle of 90 degrees between a first substrate and a second substrate, wherein a first electrode is formed in a planar solid-state on the liquid crystal side of the first substrate, and a second electrode having comb electrodes, as seen in a plan view, is formed on the liquid crystal side of the second substrate, the comb electrodes extend in a first direction and are arranged in a second direction with a pitch Q, a width of each of the comb electrodes in the second direction is w, and w<(Q−w) is satisfied, wherein a film of a material with a dielectric constant greater than the dielectric constant of the liquid crystal is formed in a portion of the first electrode corresponding to the comb electrode of the second electrode as seen in a plan view, wherein the film extends in the first direction along each of the comb electrodes in a plan view, and wherein the film is not formed at the center between the comb electrodes in the second direction in a plan view.

5. A display device with a liquid crystal lens disposed on a display panel, wherein the liquid crystal lens is formed by placing a TN type liquid crystal with a twist angle of 90 degrees between the first and second substrates, wherein a first electrode is formed in a planar solid-state on the liquid crystal side of the first substrate, and a second electrode having comb electrodes, as seen in a plan view, is formed on the liquid crystal side of the second substrate, wherein the comb electrodes extend in a first direction and are arranged in a second direction with a pitch Q, a width of each of the comb electrodes in the second direction is w, and w<(Q−w) is satisfied, wherein a film of a material with a dielectric constant smaller than the dielectric constant of the liquid crystal is formed in the first electrode between the comb electrodes of the second electrodes as seen in a plan view, and wherein the film is not formed on the first substrate corresponding to the comb electrodes of the second electrode in a plan view.

* * * * *